(12) United States Patent
Michalak et al.

(10) Patent No.: US 7,611,199 B2
(45) Date of Patent: Nov. 3, 2009

(54) SEAT BACK ADJUSTMENT MECHANISM

(75) Inventors: Eric Bernard Michalak, Westland, MI (US); Robert Michael Benzing, Brighton, MI (US); David Hensel, Canton, MI (US)

(73) Assignee: Johnson Controls Technology Company, Holland, MI (US)

( * ) Notice: Subject to any disclaimer, the term of this patent is extended or adjusted under 35 U.S.C. 154(b) by 235 days.

(21) Appl. No.: 10/578,278

(22) PCT Filed: Nov. 5, 2004

(86) PCT No.: PCT/US2004/036912

§ 371 (c)(1),
(2), (4) Date: May 5, 2006

(87) PCT Pub. No.: WO2005/047057

PCT Pub. Date: May 26, 2005

(65) Prior Publication Data

US 2007/0063562 A1      Mar. 22, 2007

Related U.S. Application Data

(60) Provisional application No. 60/519,304, filed on Nov. 11, 2003.

(51) Int. Cl.
*A47C 1/024* (2006.01)
*B60N 2/02* (2006.01)
(52) U.S. Cl. ............. 297/300.2; 297/284.9; 297/452.56
(58) Field of Classification Search ............. 297/284.9, 297/284.1, 284.4, 285, 300.2, 452.56
See application file for complete search history.

(56) References Cited

U.S. PATENT DOCUMENTS 5,505,520 A * 4/1996 Frusti et al. ............. 297/284.4
5,582,459 A * 12/1996 Hama et al. .............. 297/300.2

(Continued)

FOREIGN PATENT DOCUMENTS

EP          0 754 591 A2      1/1997

(Continued)

OTHER PUBLICATIONS

International Search Report for PCT/US2004/036912, date of mailing Sep. 23, 2005, 3 pages.

*Primary Examiner*—David Dunn
*Assistant Examiner*—Erika Garrett
(74) *Attorney, Agent, or Firm*—Foley & Lardner LLP

(57) ABSTRACT

A seat for use by an occupant in a vehicle. The seat includes a seat base configured to be supported in the vehicle. A back frame including a first transverse member, a first side member and a second side member, wherein the first transverse member interconnects each of the side members at a location toward an upper end of the back frame. The back frame further includes a second transverse member interconnecting the first and second side members a spaced distance from the first transverse member. A compliant back member having a first end operably connected to the first transverse member and a second end operably connected to the second transverse member. A biasing member having a first end operatively engaging the compliant back member and a second end being anchored with respect to the back frame wherein when a seat occupant's back applies a force to the compliant back member, the biasing member applies a reaction force.

16 Claims, 2 Drawing Sheets

U.S. PATENT DOCUMENTS

| | | | |
|---|---|---|---|
| 5,664,841 A * | 9/1997 | Dal Monte | 297/408 |
| 5,782,536 A * | 7/1998 | Heidmann et al. | 297/440.15 |
| 5,868,466 A | 2/1999 | Massara et al. | |
| 6,789,846 B2 * | 9/2004 | Humer et al. | 297/216.12 |
| 6,817,668 B2 * | 11/2004 | DeKraker et al. | 297/300.8 |
| 7,237,847 B2 * | 7/2007 | Hancock et al. | 297/452.56 |
| 2003/0193227 A1 | 10/2003 | DeKraker et al. | |

FOREIGN PATENT DOCUMENTS

| | | |
|---|---|---|
| WO | WO 03/068557 A1 | 8/2003 |

* cited by examiner

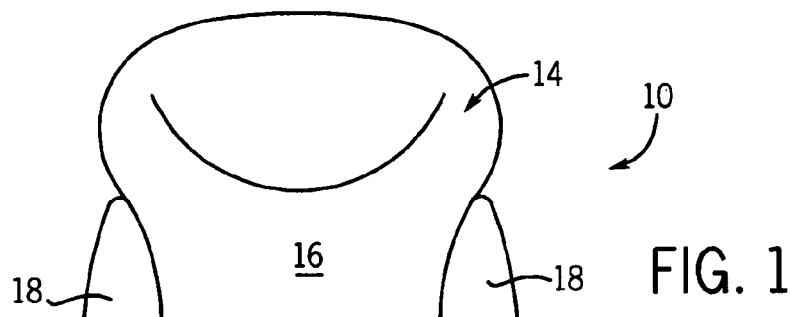
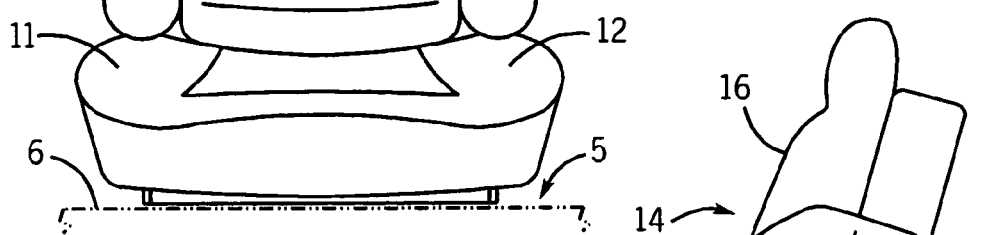
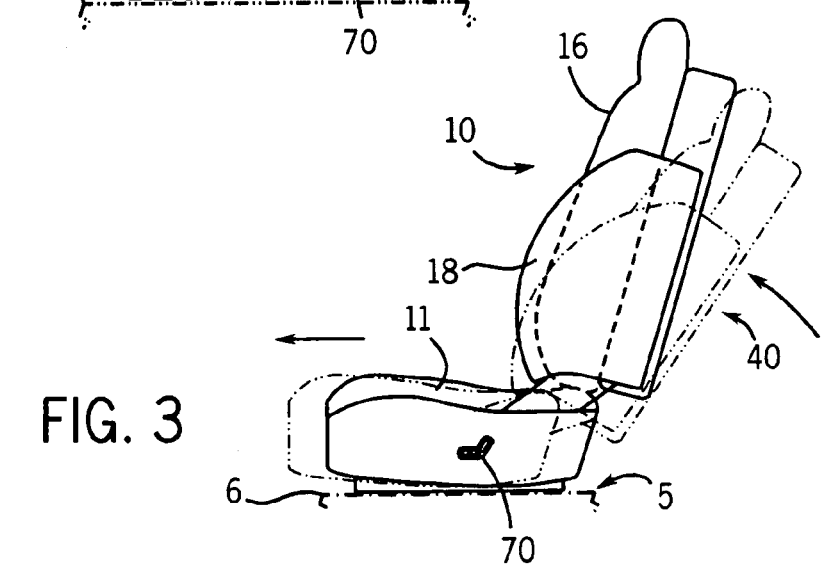

SEAT BACK ADJUSTMENT MECHANISM

CROSS-REFERENCE TO RELATED PATENT APPLICATIONS

This application is the National Phase application of International Application No. PCT/US2004/036912 filed Nov. 5, 2004 and this application claims the benefit of U.S. Provisional Application No. 60/519,304 filed Nov. 11, 2003, and incorporated herein by reference in its entirety.

FIELD

The present invention relates generally to the field of seats and more particularly relates to a seat having a compliant back member such as an automotive seat having a seat back having a flexible member.

BACKGROUND

It is known to provide a chair or seat having a compliant back member pivoted to a seat back frame assembly in at least two vertically spaced-apart locations for providing a controlled curvilinear flexure support. For examples of the above, see U.S. Pat. Nos. 5,871,258; 5,909,923; 5,975,634; 5,979,984; 6,079,785; 6,086,153; 6,220,661 which disclose a office chair including a compliant back member. The prior art office chair has significant drawbacks in terms of its packaging and that it does not include a balanced seat back adjustment device for controlling the compliant back member.

It is also known to provide an automotive seat having an adjustable lumbar consisting of a flexible member having a first end anchored and a second end moved with respect to the first end to cause the flexible member to vary its shape to provide adjustable support within the lumbar region of an automotive seat. For example, U.S. Pat. Nos. 5,397,164; 5,498,063; 5,626,390; 5,775,773; 6,003,941; and 6,254,187, each disclose known adjustable lumbar devices including a flexible member. However, none of these devices are capable of working with a compliant back member similar to that known in the prior art. Further, none of the known adjustable lumbar devices disclose or teach an adjustment mechanism having sufficient strength and robustness as required to apply the compliant back member of the known chair art to a vehicle seat. Further, it is known to provide a compliant back member in a vehicle seat including a tension adjust member using a Bowden cable arrangement. For example, PCT Patent Application No. PCT/US03/04210, filed Feb. 11, 2003, entitled Automotive Seat with Live Back, discloses such a device.

Notwithstanding the known devices, there remains a significant and continued need to develop a seat which is capable of better supporting an occupant of the seat using a more simple device. In particular, there remains a need to provide an automotive seat which is capable of providing continuous support for a plurality of sizes of seat occupants while reducing the complexity and cost of known devices and designs. Further, there remains a need to provide an automotive seat that includes a compliant or flexible seat back that automatically adjusts to an occupant's unique shape and posture including being able to adjust to the occupant's changing shape and posture while providing continuous support. Further, there remains a need to provide an automotive seat having a seat back that is capable of providing an occupant with individualized support and which is capable of permitting back and spinal motion. There also remains a need to provide an automotive seat having a seat back that can pivot more naturally in relation to an occupant and which is capable of better keeping the a lumbar support in contact with the occupant.

It is desirable to provide an automotive seat that provides one or more of these and other advantageous features. Other features and advantages will be made apparent from the present description. The teachings disclosed extend to those embodiments that fall within the scope of the appended claims, regardless of whether they accomplish one or more of the aforementioned needs.

SUMMARY OF THE INVENTION

One embodiment of the invention relates to a vehicle seat for use by an occupant in a vehicle. The vehicle seat comprises a seat base coupled to a support structure of the vehicle. A back frame including a first or upper transverse member or portion, a first side member or portion and a second side member or portion wherein the upper transverse member or portion interconnects each of the side members or portions at a location toward an upper end of the back frame, the back frame further includes a second or lower traverse member or portion, coupled to the first and second side members or portions a spaced distance from the first traverse member or portion. In one embodiment, the back frame may be as a single element or may be made of any number of integrated pieces.

A compliant back is operably connected at a location toward a first or upper end to the first traverse member and operably connected at a location toward a second or lower portion to the coupled to the second traverse member by at least one slidable pivot member. In one embodiment the compliant back is operably connected at its lower end. and is further provided with a seat back biasing member for biasing the compliant back with respect to the back frame.

The biasing member preferably includes a first and second spring members disposed adjacent one another and each having a first end having a roller member engaging a lumbar portion of the compliant back member and a second end anchored with respect to the seat back frame such that the first and second spring members bias the roller members against the lumbar portion of the compliant back. In one embodiment, the first and second spring members are preferably in the form of clock or coil springs being wrapped around a shaft or rod and the second ends of the springs are anchored on the shaft. The shaft is preferably journaled in the seat back frame and is rotatable such that when the shaft is rotated the amount of energy stored in each of the first and second springs is adjusted. An additional embodiment includes a drive motor coupled to the shaft to rotate the shaft and adjust the amount of tension in the first and second spring members.

BRIEF DESCRIPTION OF THE DRAWINGS

FIG. 1 is a front view of an exemplary embodiment of a vehicle seat.

FIG. 2 is a side view of an exemplary embodiment of a vehicle seat.

FIG. 3 is a side view of an exemplary embodiment of the vehicle seat illustrated in FIG. 2 depicting proportionate movement of the back in relation to the seat.

DETAILED DESCRIPTION OF THE PREFERRED EMBODIMENT

Figure 4:
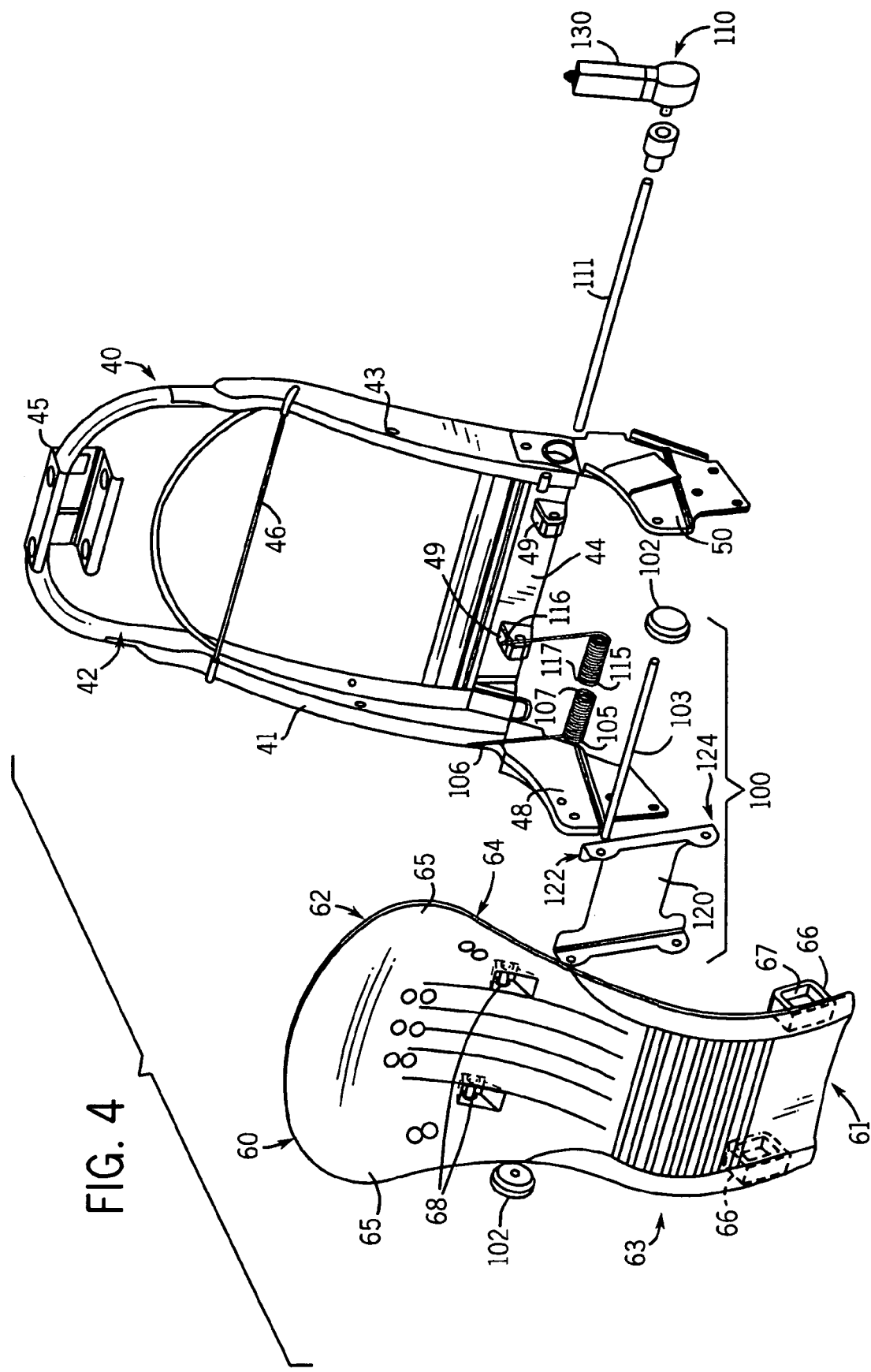
FIG. 4 is an exploded perspective front view of an exemplary embodiment of a seat back of the exemplary vehicle seat with the covers and cushions removed.

Before beginning the detailed description of the preferred and exemplary embodiments, several general comments are warranted about the applicability and the scope of the present invention. First, the illustrations relate to a seat (also referred to as a chair) particularly adapted for motor vehicles, such as cars, SUVs, vans, trucks, buses and the like, but the invention is applicable also to seating used in other vehicles such as aircraft, railroad, nautical or others as well as other non-vehicle applications such as office chairs and other similar environments.

Second, the seat of the present invention is illustrated in the first few FIGURES as a padded seat having certain contours, trim and the like. While this configuration is presently preferred, a wide variety of seat configurations and appearances will benefit from use of the mechanical support and movement mechanisms described in connection with the later FIGURES. Also the exterior of the seat can be covered by fabric, vinyl, leather or other materials known and used in the seating art. Third, with regard to the seat described herein, substantial modifications can be made without departing from the invention's intended scope. For example, while certain mechanical systems are described to move seat components to achieve certain results, other mechanisms, manual or powered could be substituted therefore. For example, where a motor is used in moving a member, other mechanical equivalents including, but not limited to, linkages, pneumatics, rack and pinion systems, cams and cables, gears, etc. could be employed. These particular mechanisms do not, in and of themselves, form the present invention, but when combined with the other pivot, support, rotation and moving mechanisms define the invention and result in more comfortable seating for the occupant as defined herein.

Referring generally to the Figures and in particular to FIGS. 1-3 there is shown a vehicle seat 10 for use in a vehicle 5 of any known type. The vehicle seat 10 includes a seat base 12 and a seat back 14 pivotally connected to the seat base 12. The seat 10 can be either a manually adjustable seat or may be provided with electric motors to provide automated adjustment and electronic control of the seat. Such manipulation can be accomplished by the use of a change of position mechanism 70 coupled to a back frame 40 and seat base 12. The change of position or recliner mechanism provides for the back frame 40 to move in relation to the seat base 12.

The seat 10 is connected to the floor of the support structure 6 of a vehicle 5 in any of a variety of configurations or designs which allow for the movement and adjustment of the seat 10 within the vehicle 5. The vehicle seat 10 may optionally include a headrest (not shown) which may also be adjustable with respect to an occupant of the seat 10 such as any known or appropriate headrest.

The seat back 14 of the vehicle seat 10 preferably includes a central portion cushion 16 and a pair of side bolsters 18 positioned on the sides of the central portion cushion 16. The cushion 16 is preferably contoured to receive and support the back lumbar of an occupant of the vehicle seat 10. The side bolsters 18 are also preferably aligned with respect to the cushion 16 and contoured to provide an angled, gradual support of the lateral side portions of an occupant of the vehicle seat 10. The cushion 16 and side bolsters 18 preferably include a foam material and a cover of any appropriate or known material such as cloth, vinyl, leather, etc. The cushion 16 and bolsters 18 preferably include support frame members as more fully described below.

The seat back 14 further preferably includes a back frame 40 including a cover of any appropriate or known material such as cloth, vinyl, leather, etc. and which preferably matches the cover material of the seat 10, back cushion 16, side bolsters 18 and seat base 12. However, it should be understood that a different material may be used on any element.

Referring now to FIG. 4, there is shown an exploded view of the seat back 14 of FIGS. 1-3 with the cover material and foam cushions removed. The back cushion 16 includes a compliant back member 60 as more fully described below. The back frame 40, with the cover removed, includes a back frame member 42 consisting of a first side member 41 and a second side member 43. The back frame member 42 is provided with lower ends 48, 50 of the first and second side members 41 and 43, respectively, which are preferably pivotally attached to the seat base 12. The vehicle or automotive seat 10 may alternatively includes an electric drive motor coupled to articulate the movement of the back frame 40 in relation to the seat base 12.

The word "compliant", as used in the compliant back member 60, is used herein as intended to refer to the flexibility of the present back especially in the lumbar area or a back structure that provides the equivalent of that flexibility, and the present back member or shell is compliant and designed to work sympathetically with the human back. The word "sympathetically" is intended to mean that the back member moves in close harmony with a seated user's back and posturally supports the seated user's back as the seat back is reclined and when a seated user flexes his/her lower back. The back member has three specific regions, as does the human back, those being the thoracic region, the lumbar region and the pelvic region.

The compliant back member 60 includes a lower or second portion 61, an upper or first portion 62 and a slotted, flexible portion 63 intended to be aligned with and conform to the lower or lumbar back portion of an occupant of the seat 10. The compliant back member 60 further preferably includes a middle portion 64 located between the lower portion 61 and upper portion 62 for connecting the compliant back with an upper transverse member 46 of the seat back frame 40. Expanded side portions 65 extend from the middle portion 64 and the upper portion 62 above the side bolsters 18 and are intended to support the upper back and extremities of an occupant of the vehicle seat 10. The side bolsters 18 are aligned with the compliant back member 60 such that the compliant back member 60 can be moved clear of the side bolsters 18. The compliant back 60 can be formed as an integral, single piece or a combination or integration of parts that are bonded together such as with epoxy, adhesive, fasteners or the like.

The compliant back member 60 together with its related cushioning forms a central back support for a seated occupant that is particularly comfortable and sympathetic to back movement of the seated occupant particularly in the lumbar area of the back of the occupant. The adjustment features on the assembly provide further comfort and allow a seated occupant to customize the seat 10 to meet his/her particular needs and preferences in the upright through reclined positions. A variety of constructions are contemplated for the back frame 40 and the compliant back 60 and accordingly, the examples should not be limited to only one particular style or material. For example, the back frame 40 could be entirely metal, plastic or a combination thereof and could be a single unitary piece or be numerous pieces made integral in any known or appropriate manufacturing process.

The back frame member 42 further preferably includes a first or upper transverse or cross member 46 and a spaced distance lower toward the ends 48 and 50 of the first and second sides 41 and 43, a second or lower transverse or cross member 44. The first transverse member 46 is preferably aligned with the middle portion 64 of the compliant back member 60 and connects or interconnects the first and second side members 41 and 43 of the back frame 40 to provide structural rigidity to the seat back frame member 42. The compliant back member 60 is preferably pivotally attached at a pair of pivots 68 to the first transverse member 46 such that the upper portion 62 and the side portions 65 of the compliant back member 60 extend in a cantilevered fashion over the upper portion of the seat back frame member 42 and a spaced distance from the back frame. For example, when the occupant in the seat leans into the upper portion 62 of the compliant back member 60, the upper portion 62 of the compliant back member can flex about the pivots 68 until contacting the upper end of the back frame. Any known or appropriate attachment or fastener is used for the pivots 68 to pivotally connect the compliant back 60 to the first transverse member 46.

Similar to the above, the second transverse member 44 is preferably aligned with the lower portion 61 of the compliant back member 60 and connects or interconnects the first and second side members 41 and 43 of the back frame 40 to provide structural rigidity to the seat back frame member 42. The lower portion 61 of the compliant back member 60 is preferably pivotally connected to the seat back frame member as described below. The second transverse member 44 preferably includes first and second blocks or tension adjust support members 49. It should be noted that the transverse members 44 and 46 may be manufactured or formed as tubular, angle iron or a stamping or have any known or appropriate cross sectional shape or design.

The lower portion 61 of the compliant back member 60 includes a connecting member in the form of a pair of glide blocks 66 for slidably and pivotally connecting the lower portion 61 with respect to the lower ends 48, 50 of the first and second side members 41 and 43 of the back frame 40. The glide blocks 66 are preferably formed as part of the compliant back 60 but may be made integral with the compliant back 60 or otherwise attached in any appropriate manner or method. The glide blocks preferably each include a passage or slot 67 designed to have an angle to accommodate the pivoting and translation of the compliant back member 60 and allow the lower end 61 to move as the occupant's weight is applied to the lumbar region 63 of the compliant back member 60.

The vehicle seat 10 further includes a bias member or apparatus 100 which operates to bias the lumbar portion 63 of the compliant back member 60 about the lower end 61 pivot points defined by the support towers 49 connected to the lower transverse member 44. The bias member 100 at its first end includes a pair of slides in the form of rollers 102 which are aligned to engage the compliant back member 60 in its lumbar region 63. The rollers 102 are connected to a shaft 103. The bias member 100 preferably includes a first biasing member 105 in the form of a clock spring having a first end 106 for engaging the shaft 103 and a second end 107. The bias member 100 preferably includes a second biasing member 115 in the form of a clock spring having a first end 116 for engaging the shaft 103 and a second end 117. The first ends 106 and 116 preferably engage the shaft 103 to bias the shaft 103 and rollers 102 toward the compliant back member 60.

The bias member 100 further preferably includes a lateral support member or bracket 120 connected at a first end 122 with the shaft 103. The lateral support bracket 120 carries the shaft 103 preferably such that a force applied to the compliant back member 60 in the lumbar region 63 is distributed more evenly to the first and second bias members 105 and 115. The lateral support member 120 preferably has a second end 124 located distal from the first end 122 and toward the lower end 61 of the compliant back member 60.

The biasing apparatus 100 is preferably adjustable and includes a biasing member adjuster 110 which preferably includes a shaft 111 fixedly connected to the second ends 107 and 117 of the first and second bias members 105 and 115. Thus rotation of the shaft 111 causes the ends 107 and 117 of the clock spring bias members to rotate and store either more or less energy in the first and second bias members 105 and 115, respectively, to effect the amount of lower back tension within the compliant back member 60. The adjuster 110, may be operated by a manual system or more preferably by an electric motor 130 coupled to the shaft 111, with any known or appropriate convenient controls.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature While the drawings and examples described herein include various exemplary embodiments, they serve the purpose of illustrating the invention only. The inventions disclosed are not limited to the specific forms shown. The systems and methods depicted and described are not limited to the precise details and conditions disclosed. Furthermore, other substitutions, modifications, changes, and omissions may be made in the design, operating conditions, and arrangements of the exemplary embodiments without departing from the scope of the invention as expressed in the appended claims.

What is claimed is:

1. A seat for use by an occupant in a vehicle, the seat comprising:

a seat base configured to be supported in the vehicle;

a back frame including a first transverse member, a first side member and a second side member, wherein the first transverse member interconnects each of the side members at a location toward an upper end of the back frame, the back frame further including a second transverse member interconnecting the first and second side members a spaced distance from the first transverse member;

a compliant back member having a first end operably connected to the first transverse member and a second end operably connected to the second transverse member; and a biasing member having a first end including rollers which are aligned and operatively engage the compliant back member and a second end including an adjustable biasing member adjuster operatively coupled to a spring member, wherein when the occupant's back applies a force to the compliant back member, the biasing member applies a reaction force, and wherein the adjustable biasing member adjuster is configured to effect an amount of lower back tension within the compliant back member by causing a given end of the spring member to rotate.

2. The seat of claim 1, wherein the compliant back member is coupled to the second transverse member by at least one pivot member such that an upper portion of the compliant back member extends in a cantilevered fashion about a pivot over the upper end of the back frame and a spaced distance from the back frame, and
wherein when the occupant in the seat leans into the upper portion of the compliant back member, the upper portion of the compliant back member can flex about the pivot until contacting the upper end of the back frame.

3. The seat of claim 2, further comprising at least one additional pivot member located a spaced distance from the at least one pivot member and coupled to the compliant back member and the second transverse member.

4. The seat of claim 1, further comprising a side bolster coupled to each of the first and second side members of the back frame and extended from the side members.

5. The seat of claim 4, wherein the side bolsters are aligned with the compliant member back such that the compliant back member can be moved clear of the side bolsters.

6. The seat of claim 5, wherein the compliant back member includes a slotted, flexible portion and expanded side portions configured to extend above the side bolsters to support the upper back and extremities of the occupant of the seat.

7. The seat of claim 1, wherein the seat is an automobile seat.

8. The seat of claim 1, further comprising a change of position mechanism coupled to the back frame and seat base,
wherein the back frame is moved in proportional relation to the seat base.

9. The seat of claim 8, wherein the change of position mechanism includes at least one electric motor.

10. A seat for use by an occupant in a vehicle, the seat comprising:
a seat back frame;
a compliant back member having a first portion pivotally connected to the seat back frame and a second portion laterally spaced from the first portion; and
a biasing member having a first end operatively and slidably engaging the compliant back member, the biasing member including a second end
wherein the biasing member applies a force against the compliant back member,
wherein the biasing member comprises:
a first spring member aligned with a first side portion of the back frame, the first spring member having a first end having a roller member connected thereto, the roller member of the first end of the first spring member engaging the compliant back member in a location aligned with a lumbar position of the back of the occupant;
a second spring member located between a second side portion of the back frame and the first spring member, the second spring member having a first end having a roller member connected thereto, the roller member of the first end of the second spring member engaging the compliant back member in a location aligned with the lumbar position of the back of the occupant;
a lateral support member interconnecting the first spring member and the second spring member laterally transferring forces between the first spring member and the second spring member; and
a biasing member adjuster connected to second ends of the first and second spring members, and configured to effect an amount of lower back tension within the compliant back member by causing the second ends of the first and second spring members to rotate.

11. The seat of claim 10, further comprising a manual system or a motor connected to the biasing member adjuster, and
wherein the biasing member is adjustable to selectively adjust the amount of force applied by the biasing member against the compliant back member.

12. The seat of claim 1, wherein the back frame includes a top portion that connects the first and second side members, and wherein the first transverse member is located below the top portion of the back frame and the second transverse member is located below the first transverse member.

13. The seat of claim 1, wherein the adjustable biasing member adjuster comprises a shaft fixedly connected to a second end of the spring member, and
wherein rotation of the shaft causes the second end of the spring member to rotate and store either more or less energy in the spring member to effect the amount of lower back tension within the compliant back member.

14. The seat of claim 13, further comprising at least one of a manual system or an electric motor coupled to the shaft for rotating the shaft.

15. The seat of claim 10, wherein the biasing member adjuster comprises a shaft fixedly connected to the second ends of the first and second spring members, and
wherein rotation of the shaft causes the second ends of the first and second spring members to rotate and store either more or less energy in the first and second spring members to effect the amount of lower back tension within the compliant back member.

16. The seat of claim 15, further comprising at least one of a manual system or an electric motor coupled to the shaft for rotating the shaft.

* * * * *

UNITED STATES PATENT AND TRADEMARK OFFICE
CERTIFICATE OF CORRECTION

| | | |
|---|---|---|
| PATENT NO. | : 7,611,199 B2 | Page 1 of 1 |
| APPLICATION NO. | : 10/578278 | |
| DATED | : November 3, 2009 | |
| INVENTOR(S) | : Eric B. Michalak | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 397 days.

Signed and Sealed this
Eighth Day of March, 2011

David J. Kappos
*Director of the United States Patent and Trademark Office*